United States Patent
Rodniansky (10) Patent No.: US 10,810,302 B2
(45) Date of Patent: Oct. 20, 2020

(54) DATABASE ACCESS MONITORING WITH SELECTIVE SESSION INFORMATION RETRIEVAL

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/665,750

(22) Filed: Aug. 1, 2017

(65) Prior Publication Data
US 2019/0042727 A1    Feb. 7, 2019

(51) Int. Cl.
    *H04L 29/06* (2006.01)
    *G06F 21/45* (2013.01)
    *G06F 21/31* (2013.01)
    *G06F 16/182* (2019.01)
    *G06F 16/907* (2019.01)
    *G06F 21/62* (2013.01)

(52) U.S. Cl.
    CPC ............ *G06F 21/45* (2013.01); *G06F 16/183* (2019.01); *G06F 16/907* (2019.01); *G06F 21/31* (2013.01); *G06F 21/6227* (2013.01)

(58) Field of Classification Search
    CPC ............ H04L 63/1416; H04L 63/1408; H04L 63/1441; H04L 63/1458
    USPC .......................................................... 726/6
    See application file for complete search history.

(56) References Cited

U.S. PATENT DOCUMENTS

| | | | |
|---|---|---|---|
| 2014/0181933 A1* | 6/2014 | Sanjeev | H04L 63/0823 726/7 |
| 2014/0258715 A1 | 9/2014 | Rodniansky | |
| 2014/0283115 A1 | 9/2014 | Ben-Natan et al. | |
| 2016/0036841 A1* | 2/2016 | Rodniansky | G06F 16/951 713/187 |

OTHER PUBLICATIONS

IPCOM000238708D, "Pluggable Interception of Secure Data with Database Protocol Reconstruction in External Database Security Mechanisms," Sep. 12, 2014.

* cited by examiner

*Primary Examiner* — Evans Desrosiers
(74) *Attorney, Agent, or Firm* — Jeffrey S. LaBaw; David H. Judson (57) ABSTRACT

A database access control system is augmented to enable an external security device to fully assess a database query against a security policy even when the device does not obtain (or otherwise misses) session information that is needed to facilitate that check. Upon receipt from a local agent of a database protocol packet to be examined, the device determines whether any session information needed for the evaluation is unavailable or is otherwise missing. If so, the device extracts metadata from the database protocol packet and generates a separate request back to the agent based on the extracted metadata. The agent then uses information in the separate request to obtain the unavailable or missing session information and, upon its receipt, forwards that information to the device. Upon receiving the additional session information that it needs, the device performs its usual security policy validation on the original database query (as augmented with the additional information returned by the agent).

22 Claims, 4 Drawing Sheets

REQUEST:
```
00000000 : 01 01 00 48 00 00 01 00 16 00 00 00 12 00 00 00    ...H............
00000010 : 02 00 00 00 00 00 00 00 00 00 01 00 00 00 73 00    ..............s.
00000020 : 65 00 6c 00 65 00 63 00 74 00 20 00 61 00 20 00    e.l.e.c.t. .a. .
00000030 : 66 00 72 00 6f 00 6d 00 20 00 70 00 61 00 72 00    f.r.o.m. .p.a.r.
00000040 : 69 00 73 00 0d 00 0a 00                            i.s.....
```
⟵ 600

RESPONSE:
```
00000000 : 04 01 00 70 00 34 01 00 aa 58 00 d0 00 00 00 01    ...p.4...X......
00000010 : 10 1c 00 49 00 6e 00 76 00 61 00 6c 00 69 00 64    ...I.n.v.a.l.i.d
00000020 : 00 20 00 6f 00 62 00 6a 00 65 00 63 00 74 00 20    . .o.b.j.e.c.t.
00000030 : 00 6e 00 61 00 6d 00 65 00 20 00 27 00 70 00 61    .n.a.m.e. .'.p.a
00000040 : 00 72 00 69 00 73 00 27 00 2e 00 09 48 00 50 00    .r.i.s.'....H.P.
00000050 : 42 00 4c 00 41 00 44 00 45 00 30 00 31 00 00 01    B.L.A.D.E.0.1...
00000060 : 00 00 00 fd 02 00 fd 00 00 00 00 00 00 00 00 00    ................
```
⟵ 602

FIG. 6

```
CLIENT_HOSTNAME = HPBXXX01
CLIENT_PROGRAM = SQLCMD
CLIENT_PROCESS_ID = 4300
NET_LIBRARY = TCP/IP
NET_ADDRESS = 88:D0:08:39:7F:09
LOGIN_NAME = HACKER
```
⟵ 700

FIG. 7

```
000001f0 : 00 0f 00 00 00 0f 41 55 54 48 5f 53 45 52 56 45    ......AUTH_SERVE
00000200 : 52 5f 50 49 44 05 00 00 00 05 31 32 31 33 35 00    R_PID.....12135.
00000210 : 00 00 00 13 00 00 00 13 41 55 54 48 5f 53 43 5f    ........AUTH_SC_
```
⟵ 800

FIG. 8

```
SQL> select b.username, b.program from v$session b, v$process
a where b.paddr = a.addr and type='USER' and spid = 12135;
```
⟵ 900

| USERNAME | PROGRAM |
| --- | --- |
| SYS | sqlplus@rh6u2x64t (TNS V1-V3) |

DATABASE ACCESS MONITORING WITH SELECTIVE SESSION INFORMATION RETRIEVAL

BACKGROUND OF THE INVENTION

Technical Field

This disclosure relates generally to securing resources in a distributed computing environment and, in particular, to database access security.

Background of the Related Art

Protecting a database using network-based intrusion detection is well-known. Systems of this type analyze database access attempts prior to transport into a host computer system and accordingly, mitigate resource overhead. Host computer systems, however, often employ local access. Because monitoring access attempts via the network monitor may not encompass such local access attempts, it is also known to provide a data security device that intercepts both local and remote access attempts to the database.

A data security device of this type typically monitors all database access attempts for auditing and security analysis. In operation, the data security device receives local access transactions via a local agent on the host. Typically, the local agent identifies and integrates with an inter-process communication (IPC) mechanism on the host computer system. Using an IPC interception mechanism (or, in an alternative, cryptographic method invocation or the like), the local agent directs local database access attempts to the local agent, which then forwards the intercepted attempts to the data security device for further analysis. The data security device typically is remote from the database host and thus is sometimes referred to as an "external security device" (or "ESD"), or "external-to-database non-intrusive security mechanism (or "EDSM"). An EDSM observes local access attempts via interception and transmission to the device, thereby consolidating analysis and logging of the data access attempts. An EDSM typically includes a database protocol analyzing module, a query parsing module, a security policy validation module, and an alert module. The core function of the EDSM is to extract a database query that is sent by a database client application to the database server from the database protocol packets that are intercepted by the agent, parse this query up to a database object level, validate the query against one or more security policies for a potential database object access violation, and issue an appropriate alert if an access violation is detected. A commercial product that provides this local database access control system (LDACS) functionality is IBM® InfoSphere® Guardium®.

While this type of processing provides significant advantages, certain information that is collected by the agent and that may be needed for the EDSM to analyze the database query is not always present in the network traffic that flows through the agent between the database client and the database server. Thus, for example, session-related information, such as user account creation date, last user account change date, database user security roles, database user privileges, and the like, often is not even available in the network traffic intercepted by the agent. In circumstances where session information of this type is not available to the EDSM, validating the query against the EDSM security policies may not be possible (or may return inaccurate results). Moreover, in practice the EDSM may be temporarily unavailable (e.g., due to overload, denial of service attack, or configuration issues), and thus it may miss seeing database session login information or other information (e.g., about database protocol structures) that the agent provides. Such information may also be missed because the EDSM receives it from the agent in encrypted form.

Thus, there remains a need in the art for an efficient and reliable way to manage EDSM operations when session information needed for validating an intercepted database query either is unavailable in the intercepted traffic or is otherwise missed by the EDSM. The technique of this disclosure addresses this need.

BRIEF SUMMARY

A database access control system is augmented according to this disclosure to provide additional functionality to enable the external security device (e.g., an EDSM) to fully and accurately assess a database query against one or more security policies even when the EDSM does not obtain (or otherwise misses) session information that is necessary or useful to facilitate that validation check. To this end, and upon receipt from a local agent of a database protocol packet to be examined by the EDSM, the EDSM determines whether any session information needed for the evaluation is unavailable (from the intercepted packet) or is otherwise missing. If the outcome of this determination is positive, the EDSM extracts certain metadata from the database protocol packet and generates a separate request back to the agent based on the extracted metadata. The intercepting agent then uses information in the separate request to obtain the unavailable or missing session information and, upon its receipt, the agent then forwards that information to the EDSM. Once the EDSM receives the additional session information that it needs, the EDSM performs its usual security policy validation on the original database query (as augmented with the additional information returned by the agent). To facilitate this processing in a scalable way, the EDSM request to the agent preferably is formulated in a lightweight manner so as to no burden the intercepting agent unnecessarily.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
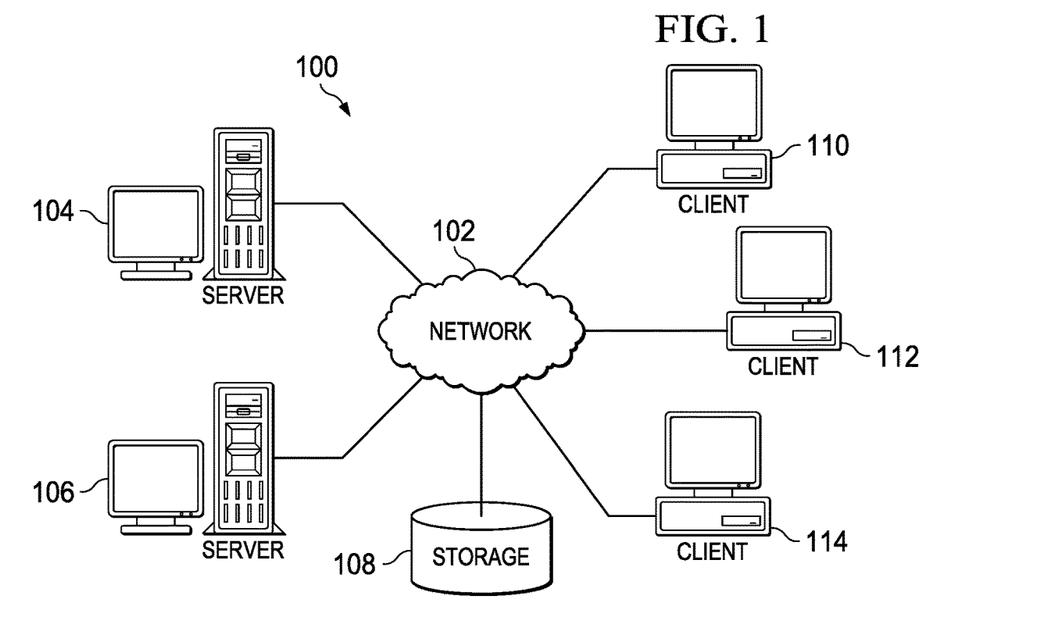
FIG. 1 depicts an exemplary block diagram of a distributed data processing environment in which exemplary aspects of the illustrative embodiments may be implemented.
Figure 2:
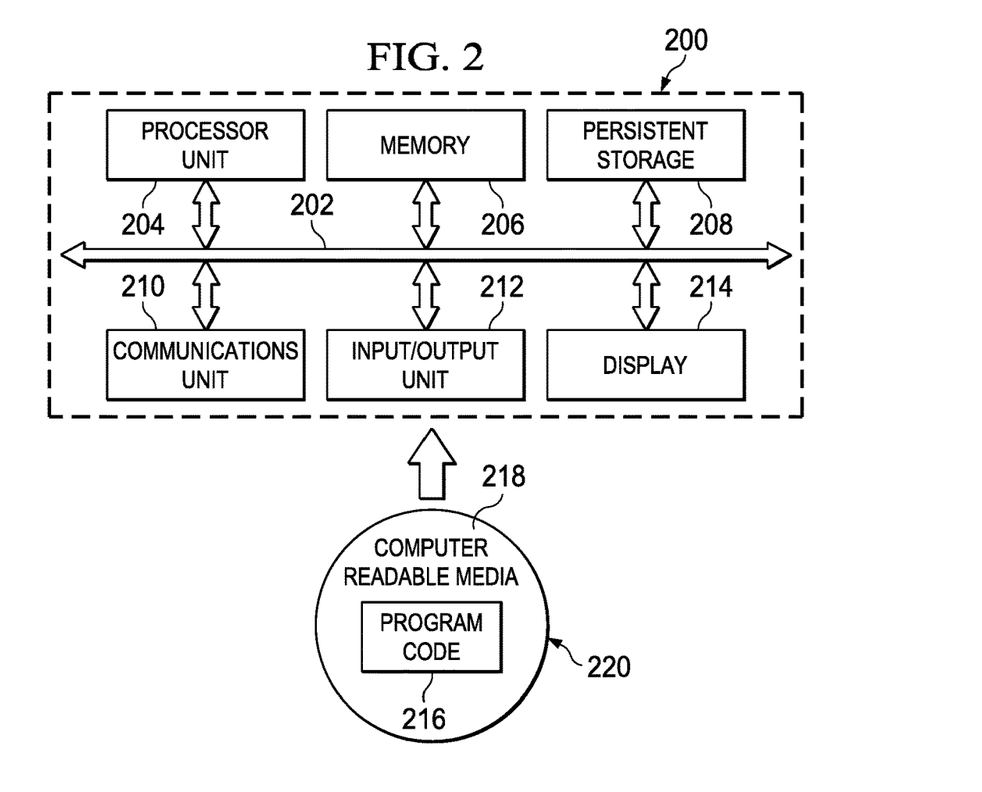
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Local Database Access Control

Auditing and logging operations, as well as highly security-sensitive applications, expect coverage of all local and remote access attempts. To this end, and as described above, it is known in the prior art to enhance conventional network-based intrusion detection and monitoring by intercepting local access attempts in addition to the database access attempts occurring via the network. A Local Database Access Control System (LDACS) provides this functionality. In this approach, typically an IPC intercept is defined to identify an access point common to local and remote DB access attempts. Local access attempts to the database are intercepted and transported to a data security device operable for network monitoring of the access attempts. Because the data security device is remote, it is sometimes referred to herein as an "external security device" (or "ESD"), or "external-to-database non-intrusive security mechanism" ("EDSM"). The IPC intercept performs interception of the local access attempts through a minimal footprint implementation object to mitigate resource overhead. In this manner, the remote network data security device observes both the local access attempts via interception at the DB host and transmission of the intercepted access attempts to the data security device, and the remote access attempts via the network, thereby consolidating analysis and logging of the data access attempts to the database resource via the data security device.

Figure 3:
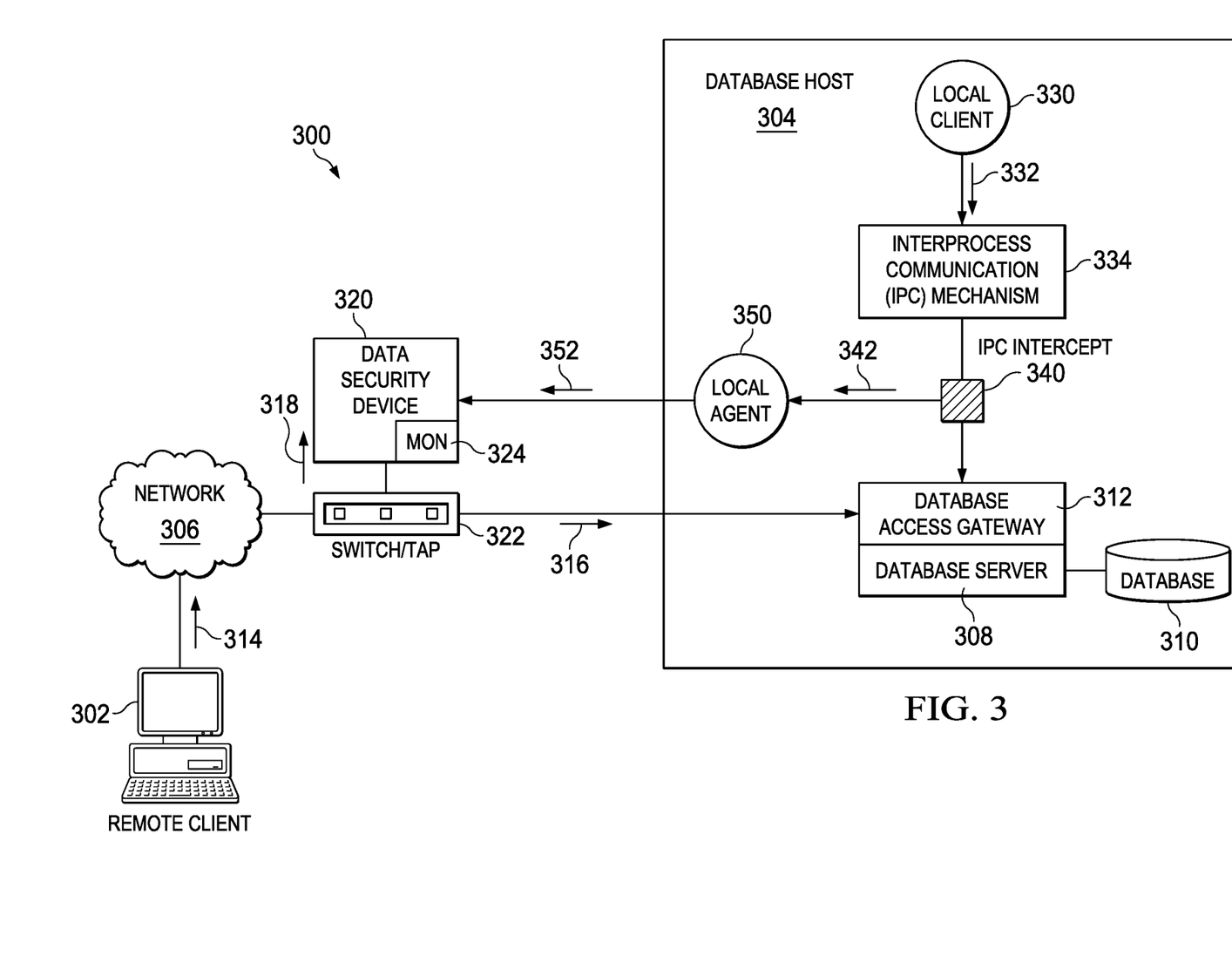
FIG. 3 depicts the high level operation of a known Local Database Access Control System (LDACS)

FIG. 3 illustrates this basic operation in more detail. Referring to FIG. 3, the environment 300 provides a remote user 302 with a database (DB) host 304 for data storage and retrieval operations (DB operations). The user 302 connects to the host 304 via an access network 306, which may be any suitable internetworking infrastructure such as a LAN, intranet, extranet or the Internet. The DB host 304 includes a database server 308 connected to the database 310, typically a disk array or set of mass storage devices such as disk drives. The database 308 includes a DB access gateway 312, which operates as an application programming interface (API) for user 302 access via a variety of access methods.

A user initiates access to the database in the form of a user request 314, which passes through the network 306 for delivery to the DB access gateway 312 as an incoming request 316. A data security device 320 is connected via a switch e22 or other connectivity device such as a tap, router or bridge, on the path from the network 306 to the host 304. The data security device 320 includes a DB monitor 324 for receiving user requests 314 sent through the switch 322. The DB monitor receives and analyzes the incoming user request 314 as a tapped access attempt 318, which the DB monitor 324 analyzes according to a predetermined security or access policy. The data security device 320 then passes the tapped access attempt 318 to the access gateway (AG) 312 as an incoming request 116.

Typically, the database server 308 expects a substantial portion of DB traffic (user requests 314) to arrive remotely via the network 306, and thus pass scrutiny under the data security device 320. However, a portion of database access attempts emanate locally from a local client 330, executing on the host 304, as local access attempts 332. The local access attempts 332 arrive at the access gateway 312 via an Inter-Process Communication (IPC) mechanism 334. Such local access attempts 332 do not pass through the switch 322, and therefore may otherwise be operable to elude scrutiny of the data security device 320. To address this concern, a known LDACS solution employs an IPC intercept 340 for intercepting the local access attempt 332 and transporting the intercepted access attempt 342 to a local agent 350. The local agent 350 determines, by interrogating the IPC mechanism 334, a database instruction 352 corresponding to the local access attempts 332. The local agent 350 then transmits the determined database instruction 352 to the data security device 320 for analysis and further operations by the DB monitor 324. In this manner, the data security device 320 receives all local and remote access attempts to the DB server 308 to more fully analyze, monitor, and guard against access attempts that may be undesirable. Although the above-described configuration is preferred, the agent 350 need not be local, but rather may be positioned in other locations or configurations associated with a database host or system.

In a typical DB host 304, the local client 330 may employ a variety of IPC mechanisms 334 to transmit local access attempt 332 to the DB server 308. IPC typically is not secure. Alternate configurations may employ other communication mechanisms, such as cryptographic remote method invocation.

Figure 4:
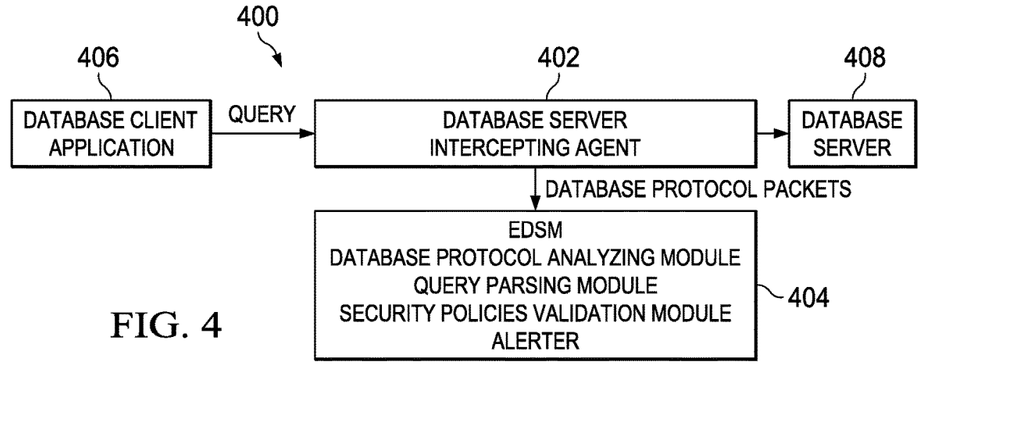
FIG. 4 is a process flow diagram illustrating the known operation of database access control of FIG. 3.

FIG. 4 depicts the basic operation of a database access control system 400 that comprises the database server intercepting agent 402 and an associated EDSM 404. As shown, the agent 402 is situated in-line between the database client application 406, and the database server 408. Queries initiated to the database server 408 by the database client application 406 are intercepted by agent 402, and database protocol packets comprising those queries are forwarded to the EDSM 408 for evaluation. Typically, and as used herein, a database protocol packet refers to a formatted unit of data used in communication between the database client application and the database server. As is known, EDSM 408 typically includes several modules, e.g., a database protocol analyzing module, a query parsing module, a security policy validation module, and an alerting module. These modules typically are implemented as software executing in hardware. The core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

As described above, however, there may be circumstances in which the EDSM does not have all of the information it needs to perform the validation of the database query. There may be several reasons why this is the case. Thus, for example, in one common operating scenario, certain information that is collected by the agent and that may be needed for the EDSM to analyze the database query is not always present in the network traffic that flows through the agent 402 between the database client application 406 and the database server 408. Thus, for example, session-related information, such as user account creation date, last user account change date, database user security roles, database user privileges, and the like, often is not available in the network traffic intercepted by the agent. In such circumstances, validating the query against the EDSM security policies may not be possible (or may return inaccurate results). Moreover, in practice the EDSM 404 may be temporarily unavailable (e.g., due to overload, denial of service attack, or configuration issues), and thus it may miss seeing database session login information or other information (e.g., about database protocol structures) that the agent 402 provides. Such information may also be missed because the EDSM 404 receives it from the agent in encrypted form.

The problem of what to do when the EDSM has insufficient information with which to make an informed validation check is addressed and solved by the subject matter of this disclosure, which is now described.

Database Access Monitoring with Selective Session Information Retrieval

According to this disclosure, a database access control system such as depicted in FIG. 4 is augmented to provide additional functionality to enable the external security device (e.g., an EDSM) to fully and accurately assess a database query against one or more security policies, even when the EDSM in the first instance does not obtain (or otherwise misses) session information that is necessary or useful to facilitate that validation check. This enhanced operation is depicted in the process flow shown in FIG. 5.

Figure 5:
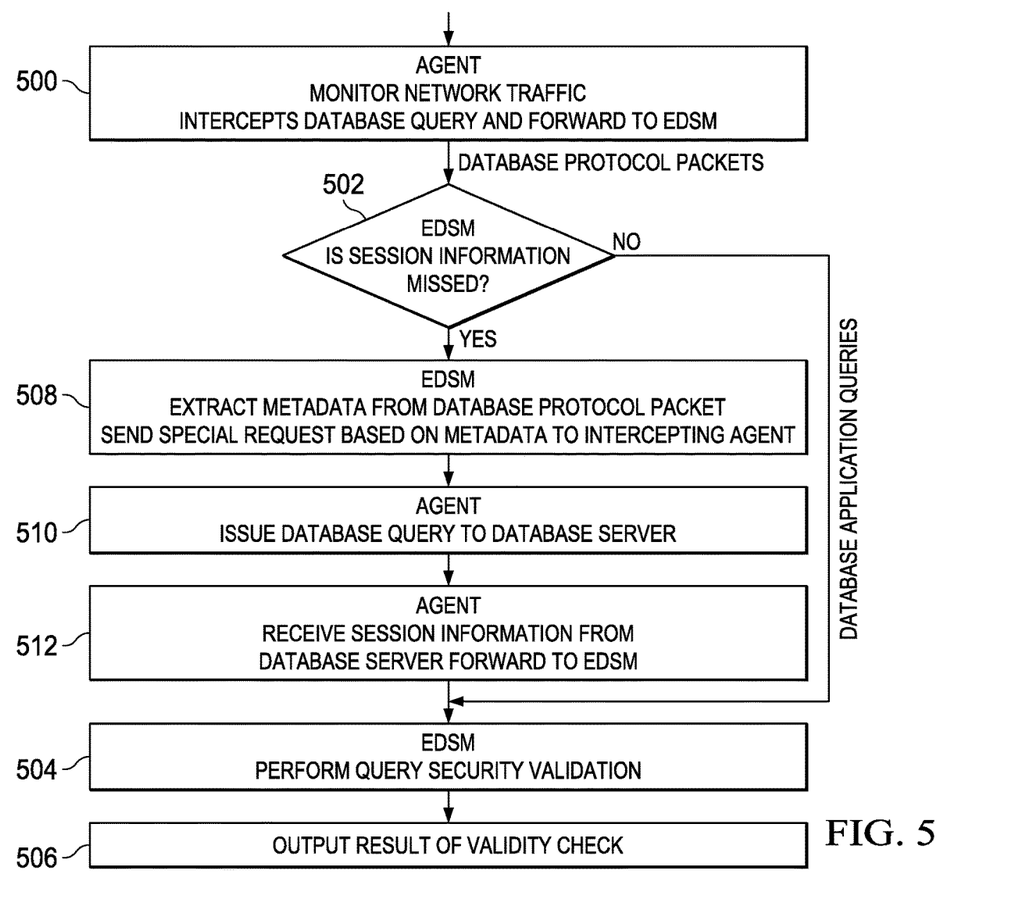
FIG. 5 depicts a process flow of a session information retrieval technique of this disclosure.

The process begins at step 500 with the database server intercepting agent intercepting an access request issued by the database client application and intended for the database server. At step 502, and upon receipt from the agent of one or more database protocol packets to be examined, the EDSM determines whether any session information needed for the evaluation is unavailable (from the intercepted packets) or is otherwise missing. If the outcome of this determination is negative, control continues at step 504 in a conventional manner with the EDSM performing the security validation check on the database query. The result of this validation check is then output at step 506. If, however, the outcome of the determination at step 502 is positive, control branches to step 508. At step 508, the EDSM extracts certain metadata from a database protocol packet, and then generates a separate request that is then delivered back to the agent. As will be described below, preferably the request is based on the metadata from the database protocol packet(s), and on information defined in a database protocol rule. At step 510, the agent attempt to obtain the necessary session information (as identified by the request received from the EDSM) by issuing a new database request to the database server itself. At step 512, the agent receives the session information from the database server and forwards it back to the EDSM. Control then returns back to step 504, as previously described, although in this iteration the EDSM also uses the session information retrieved from the database server by the agent. This completes the processing.

Thus, according to this technique, the EDSM responds to a determination that session information needed to evaluate the intercepted request is not then available, and in response instructs the intercepting agent via a special request to obtain that information on the EDSM's behalf. This additional request-response processing carried out by the EDSM and the agent in effect is conducted out-of-band with respect to the typical agent-EDSM processing flow. The intercepting agent uses information in the separate request to obtain the unavailable or missing session information and, upon its receipt, the agent then forwards that information to the EDSM. Once the EDSM receives the additional session information that it needs, the EDSM performs its usual security policy validation on the original database query (as augmented with the additional information returned by the agent).

To facilitate this processing in a scalable way, the EDSM request to the agent preferably is formulated in a very lightweight manner so as to no burden the intercepting agent (or the database server) unnecessarily. Formulating the request in a lightweight manner refers to the notion of the EDSM providing the agent with just enough information so that the agent can obtain the necessary session information from the database server, but without too much additional overhead (in terms of processing or memory) either at the EDSM or the database server. This lightweight agent processing facilitates the EDSM obtaining the information it needs but without otherwise burdening the agent or database server operations, which often are themselves processing large numbers of database queries in the normal course. In particular, in the usual situation, the EDSM simultaneously services thousands of database sessions, and this lightweight request approach ensures that there is only minimal additional load on the entities. Preferably, the requests formulated by the EDSM contain query condition(s) created on the basis of extracted from user metadata information found in the database protocol packets received form the intercepting agent. This user metadata otherwise is invisible to the EDSM, at least in the original packets forwarded by the agent.

Figure 6:
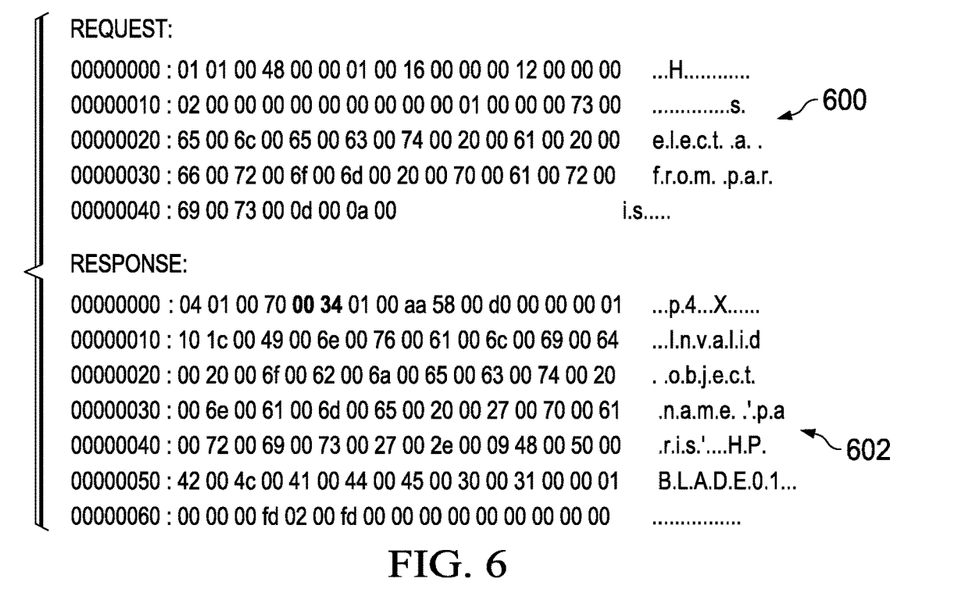
FIG. 6 illustrates a representative request intercepted by the agent, and a database server response to that query.
Figure 7:
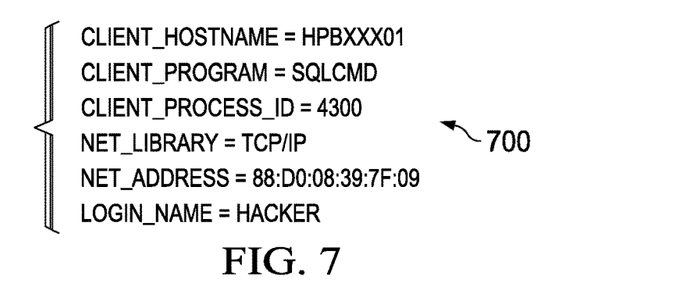
FIG. 7 illustrates the session information that is retrieved by the intercepting agent in response to its receipt of a request from the EDSM according to the technique of this disclosure.

FIG. 6 depicts an example of the EDSM special request processing according to an embodiment of this disclosure. This example is provided in the context of a Microsoft® SQL Server® database, but this is not a limitation, as the technique works in the same manner for other databases such as IBM® DB2, databases available from third parties such as Sybase® ASE, Oracle® Database, Teradata®, and others. For simplicity, the following example relates to restoring of session login information, but this is not a limitation. Thus, assume that the EDSM missed database session login information and then receives the following database session query: "select a from paris." FIG. 6 depicts the database protocol packets that comprise the request 600, as well as those database protocol packets 602 comprising the response from the database server (that is also passed to the EDSM). In this example, the network traffic between the database client application and the database server contains invisible for database user metadata. In particular, the database user (end user) is the person who sends database queries, and he or she receives queried data in response. The response data is internally wrapped in database protocol packets along with accompanying metadata, but the metadata is not conveyed to the end user. This metadata content typically is defined by one or more database protocol rules, and these rules are available to or otherwise instantiated at the EDSM. In this example, one such database protocol rule is that MS SQL metadata of this type is a SQL Server session Id (SPID), and the rule specifies or otherwise indicates that this session identifier is found in every response from the database server. According to the MS SQL database protocol rule, SPID is found in bytes 5 and 6 of the database server response. In FIG. 6, these two bytes are marked in bold in the response 602. In the particular example, SPID has a value "52") (hex 0x0034). Accordingly, and given this particular scenario, the EDSM formulates the special request to the agent as a new database query to the database server, namely: select * from sysprocesses where SPID=52. This new database query is very lightweight, as it only includes what is necessary to obtain the session information, and preferably nothing more. In this example, the query uses a table index and specifies only one record in the applicable database system table, namely, the data record corresponding to the SPID value. This request is sent from the EDSM to the intercepting agent, which then executes the query and returns the result 700 as shown in FIG. 7. As can be seen, the result 700 contains the previously missed session information required for the further security validation.

Figure 8:
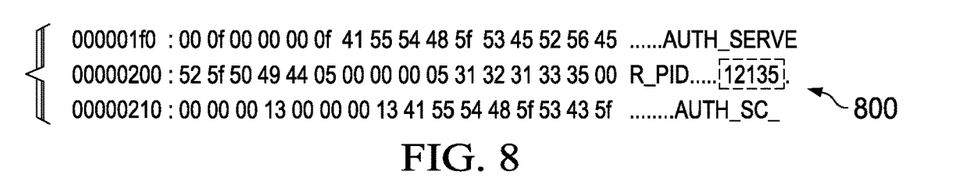
FIG. 8 depicts a database protocol packet generated by another database server type.
Figure 9:
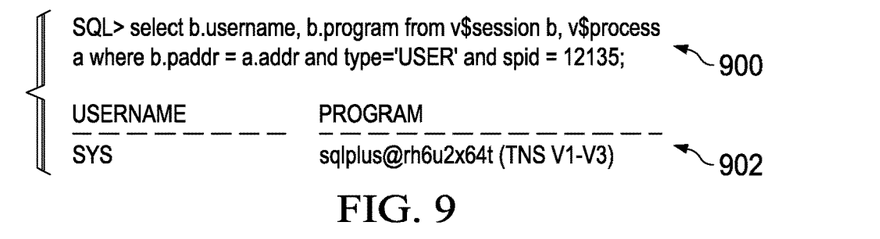
FIG. 9 depicts the EDSM query and database server response with respect to the database protocol packet shown in FIG. 8 according to the technique of this disclosure.

FIG. 8 depicts another example scenario, in this case a database protocol packet 800 produced in association with a query to an Oracle® Database. As depicted, the packet includes an internal server identifier ("12135") assigned to the process that is serving the database client. As noted above, the end user is not aware of this metadata. Assume, however, that in this example scenario the login information is missed and EDSM needs to obtain it. To this end, FIG. 9 depicts the representative query 900 that EDSM makes to the agent, together with the response 902 that is returned from the database server. As can be seen, the result of the query is database user "SYS, and database client program name "sqlplus."

The subject matter herein provides numerous advantages. The approach enables the EDSM to effectively retrieve database session information required for security validation when such information is not found in the intercepted network traffic or (if provided by the agent) is otherwise missed or not available. This approach provides for an improved database access control system that provide more accurate complete security check validations on database queries passed via the intercepting agent. The approach is scalable, despite the additional processing required, because the special request(s) issued to the intercepting agent by the EDSM are designed to be very lightweight so as not to further load either the EDSM, the agent, or the database server itself. The approach increases the overall accuracy and throughput of the system significantly, and without requiring additional database server host resources. While there are slightly greater computational requirements at the external device, this does not impact the efficiency of the overall solution, as typically the ESD is an external device that can operated without impacting database efficiency.

Generalizing, the enhanced EDSM functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the agent and EDSM components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the EDSM described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The session information retrieval technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

The "session information" is not intended to be limited to any particular aspect of the "session." Also, the approach herein involving the EDSM and agent out-of-band interaction may be used by the EDSM to obtain other than session information. In that scenario, the request may be issued to an entity other than the intercepting agent itself, such as when the information required is available from another data source.

The techniques herein provide for improvements to another technology or technical field, namely, database access control systems, as well as improvements to the operational capabilities of such systems when used in the manner described.

Having described my invention, what I claim is as follows:

1. A method operative in an external security device of a database access control system wherein database client requests directed to a database server are intercepted by an agent of the database access control system for validation against a security policy, comprising:
   receiving a database protocol packet that has been forwarded by the agent for validation, the database protocol packet including a database query to be validated against the security policy;
   determining whether session information associated with the database query and that is useful for validating the database query is available;
   based on a determination that the session information associated with the database query is not available to the external security device, identifying, based on a database protocol rule, a source of the session information, and issuing a request back to the agent to attempt to obtain the session information from the source as identified; and
   upon receipt of the session information from the agent, the session information having been obtained by the agent from the source and forwarded back to the external security device in response to the request issued from the external security device, validating the database query at least in part using the session information as obtained.

2. The method as described in claim 1 wherein identifying the source of the session information includes extracting internal metadata from the database protocol packet according to the database protocol rule.

3. The method as described in claim 2 wherein the source is associated with the database server, and wherein the extracted internal metadata is used to formulate the request as a new database query.

4. The method as described in claim 3 wherein the new database query is formulated in a restricted manner to include just data necessary to obtain the session information from the database server.

5. The method as described in claim 1 wherein the session information is one of: user account-related data, user login information, a database user security role, and a database user privilege.

6. The method as described in claim 1 wherein the session information is not available because it is not present in the database protocol packet, is not visible, or is missing.

7. The method as described in claim 1 further including validating the database query based on the determination that the session information associated with the database query is available.

8. Apparatus for use in a database access control system wherein database client requests directed to a database server are intercepted by an agent of the database access control system for validation against a security policy, comprising:
   a processor;
   computer memory holding computer program instructions executed by the processor, the computer program instructions comprising program code configured as an external security device to:
      receive a database protocol packet that has been forwarded by the agent for validation, the database protocol packet including a database query to be validated against the security policy;
      determine whether session information associated with the database query and that is useful for validating the database query is available;
      based on a determination that the session information associated with the database query is not available to the external security device, identify, based on a database protocol rule, a source of the session information, and issue a request back to the agent to attempt to obtain the session information from the source as identified; and
      upon receipt of the session information from the agent, the session information having been obtained by the agent from the source and forwarded back to the external security device in response to the request issued from the external security device, validate the database query at least in part using the session information as obtained.

9. The apparatus as described in claim 8 wherein the program code to identify the source of the session information further includes program code configured to extract internal metadata from the database protocol packet according to the database protocol rule.

10. The apparatus as described in claim 9 wherein the source is associated with the database server, further including program code configured to use the extracted internal metadata to formulate the request as a new database query.

11. The apparatus as described in claim 10 wherein the new database query is formulated in a restricted manner to include just data necessary to obtain the session information from the database server.

12. The apparatus as described in claim 8 wherein the session information is one of: user account-related data, user login information, a database user security role, and a database user privilege.

13. The apparatus as described in claim 8 wherein the session information is not available because it is not present in the database protocol packet, is not visible, or is missing.

14. The apparatus as described in claim 8 further including program code configured to validate the database query based on the determination that the session information associated with the database query is available.

15. A computer program product in a non-transitory computer readable medium, the computer program product holding computer program instructions executed by a processor and configured as an external security device of a database access control system wherein database client requests directed to a database server are intercepted by an agent of the database access control system for validation against a security policy, the computer program instructions comprising program code to:
   receive a database protocol packet that has been forwarded by the agent for validation, the database protocol packet including a database query to be validated against the security policy;
   determine whether session information associated with the database query and that is useful for validating the database query is available;
   based on a determination that the session information associated with the database query is not available to the external security device, identify, based on a database protocol rule, a source of the session information, and issue a request back to the agent to attempt to obtain the session information from the source as identified; and upon receipt of the session information from the agent, the session information having been obtained by the agent from the source and forwarded back to the external security device in response to the request issued from the external security device, validate the database query at least in part using the session information as obtained.

16. The computer program product as described in claim 15 wherein the program code to identify the source of the session information further includes program code configured to extract internal metadata from the database protocol packet according to the database protocol rule.

17. The computer program product as described in claim 16 wherein the source is associated with the database server, further including program code configured to use the extracted internal metadata to formulate the request as a new database query.

18. The computer program product as described in claim 17 wherein the new database query is formulated in a restricted manner to include just data necessary to obtain the session information from the database server.

19. The computer program product as described in claim 15 wherein the session information is one of: user account-related data, user login information, a database user security role, and a database user privilege.

20. The computer program product as described in claim 15 wherein the session information is not available because it is not present in the database protocol packet, is not visible, or is missing.

21. The computer program product as described in claim 15 further including program code configured to validate the database query based on the determination that the session information associated with the database query is available.

22. A database access control system operated in association with a database client application, and a database server, comprising:
  an agent executed in hardware and configured to intercept database client requests directed to the database server by the database client application; and
  a security mechanism executed in hardware and configured to (a) receive a database protocol packet that has been forwarded by the agent for validation, the database protocol packet including a database query to be validated against the security policy, (b) determine whether session information associated with the database query and that is useful for validating the database query is available, (c) based on a determination that the session information associated with the database query is not available, identify, based on a database protocol rule, a source of the session information, and (d) issue a request to the agent to attempt to obtain the session information from the identified source;
  the agent being further configured to (e) receive the request from the security mechanism, (f) obtain the session information from the database server, and (g) forward the session information as obtained to the security mechanism;
  the security mechanism being further configured upon receipt of the session information to validate the database query at least in part using the session information as obtained by the agent.

* * * * *